(12) United States Patent
Choi et al.

(10) Patent No.: US 9,706,748 B2
(45) Date of Patent: Jul. 18, 2017

(54) STALL FLOOR HEAT EXCHANGER REDUCING HEAT STRESS AND LAMENESS

(71) Applicant: Wisconsin Alumni Research Foundation, Madison, WI (US)

(72) Inventors: Christopher Choi, Madison, WI (US); Nigel Cook, Wanuakee, WI (US); Kenneth Nordlund, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 596 days.

(21) Appl. No.: 14/255,136

(22) Filed: Apr. 17, 2014

(65) Prior Publication Data

US 2014/0374056 A1 Dec. 25, 2014

Related U.S. Application Data

(60) Provisional application No. 61/838,682, filed on Jun. 24, 2013.

(51) Int. Cl.
*A01K 1/00* (2006.01)
*A01K 1/015* (2006.01)

(52) U.S. Cl.
CPC .......... *A01K 1/0158* (2013.01); *A01K 1/0157* (2013.01)

(58) Field of Classification Search
CPC .................. A01K 1/0158; A01K 1/0157
USPC .................................... 119/448, 526
See application file for complete search history.

(56) References Cited

U.S. PATENT DOCUMENTS

| 2,617,011 A | * | 11/1952 | Mackendrick | H05B 3/342 219/528 |
| 2,661,718 A | * | 12/1953 | Ruport | A01K 1/0158 119/483 |
| 3,041,441 A | * | 6/1962 | Elbert | A01K 1/0158 119/28.5 |
| 3,809,014 A | * | 5/1974 | Jones | A01K 1/0158 119/508 |
| 3,826,230 A | * | 7/1974 | Jones | A01K 1/0158 119/508 |
| 4,013,873 A | * | 3/1977 | Olson | A01K 1/0158 119/308 |
| 4,018,271 A | * | 4/1977 | Jones | F28F 21/062 119/508 |
| 4,217,859 A | * | 8/1980 | Herring | A01K 1/0158 119/508 |

(Continued)

FOREIGN PATENT DOCUMENTS

| DE | 2754032 A1 | * | 6/1979 | A01C 3/025 |
| DE | 4326163 A1 | * | 5/1994 | A01K 1/015 |

(Continued)

OTHER PUBLICATIONS

Nigel B. Cook et al.; The influence of the enviroment on dairy cow behavior, claw health and herd lameness dynamics; The Veterinary Journal 179; 2009; pp. 360-369; Madison, WI.

*Primary Examiner* — Devon Russell
(74) *Attorney, Agent, or Firm* — Boyle Fredrickson, S.C.

(57) ABSTRACT

A heat-exchanging mat to cool livestock provides for elastic water conduction channels displaced toward an upper surface of the mat and provides for cushioning placed below those elastic channels. In this way, a high degree of cushioning may be obtained without sacrificing an efficient transfer of heat into the upper surface of the mat.

15 Claims, 4 Drawing Sheets

(56) References Cited

U.S. PATENT DOCUMENTS

| | | | | |
|---|---|---|---|---|
| 4,591,694 A * | 5/1986 | Phillips | A01K 1/0158 | 219/217 |
| 4,884,304 A * | 12/1989 | Elkins | A47C 21/048 | 165/46 |
| 5,092,271 A * | 3/1992 | Kleinsasser | F28F 21/062 | 119/508 |
| 5,448,788 A * | 9/1995 | Wu | A47C 21/048 | 5/421 |
| 5,871,151 A * | 2/1999 | Fiedrich | F24H 1/102 | 237/69 |
| 5,966,502 A * | 10/1999 | Pearce | F28F 3/12 | 165/169 |
| 6,943,320 B1 * | 9/2005 | Bavett | H05B 3/34 | 219/213 |
| 8,011,204 B2 * | 9/2011 | Kissel, Jr. | A01K 1/0353 | 62/434 |
| 8,397,677 B2 * | 3/2013 | Bruer | A01K 1/0158 | 119/448 |
| 2003/0229385 A1 * | 12/2003 | Elkins | A61F 7/0085 | 607/104 |
| 2012/0234247 A1 * | 9/2012 | Graves | A01K 1/0158 | 119/28.5 |

FOREIGN PATENT DOCUMENTS

| | | | | |
|---|---|---|---|---|
| DE | WO 0018219 A1 * | 4/2000 | | A01K 1/0157 |
| DE | 19947349 A1 * | 4/2001 | | A01K 1/015 |
| DE | 10219976 A1 * | 11/2003 | | A01K 1/0158 |
| DE | 102005050659 A1 * | 4/2006 | | A01K 1/015 |
| DE | 102007037477 A1 * | 10/2008 | | A01K 1/0158 |
| EP | 0551226 A1 * | 7/1993 | | A01K 1/0158 |
| ES | EP 1803347 A1 * | 7/2007 | | A01K 1/0158 |
| FR | 2672966 A1 * | 8/1992 | | A01K 1/0158 |
| FR | WO 2012101362 A1 * | 8/2012 | | A01K 1/0157 |
| JP | WO 03067967 A1 * | 8/2003 | | A01K 1/0158 |
| WO | WO 0213753 A1 * | 2/2002 | | A01K 1/0157 |

* cited by examiner

STALL FLOOR HEAT EXCHANGER REDUCING HEAT STRESS AND LAMENESS

CROSS REFERENCE TO RELATED APPLICATION

This application claims the benefit of U.S. provisional application No. 61/838,682 filed Jun. 24, 2013 and hereby incorporated by reference.

BACKGROUND OF INVENTION

The present invention relates to an apparatus for cooling livestock and in particular to an improved heat exchanger providing a stall mat.

A heat-stressed cow exhibits physiological reactions and abnormal behavior such as standing up and thermal panting (both of which indicate an increased respiratory rate and a higher than normal body temperature). The cow will also eat less and drink more water. These reactions cause serious side effects: the cow will produce much less milk, become less fertile and suffer higher rates of debilitating diseases such as mastitis and lameness.

To protect cows from excessive heat, dairy farmers typically employ cooling systems that spray water directly onto the cows and rely on either overhead fans equipped with mister nozzles to promote evaporation of that water, or wide-body housing barns equipped with evaporative cooling pads and fans. However, these approaches achieve limited success in humid climates and can pose problems in hot regions where water is scarce.

An alternative approach to cooling cows involves using a heat exchanger positioned beneath the bedding material or under a cushion in the stall. The heat exchanger provides a set of conduits through which chilled water can be circulated, and the bedding material protects the conduits and provides the cushioning necessary to avoid further discomforting cows that are lame that may otherwise deleteriously modify their resting behavior.

SUMMARY OF THE INVENTION

The present inventors have determined that, due to its thermal resistance, the thickness of a bedding material (such as sand or compost) that is placed over a heat exchanger to mitigate lameness substantially impedes the conduction of heat from the cow. The present invention solves this problem by using a heat exchanger that is equipped with elastic water conduction channels and may be positioned above the cushioning. Consequently, the cold water in the exchanger will be in direct contact with the resting cow, perhaps separated from the cow by only a relatively thin elastic sheet, for example, and any necessary cushioning can be installed beneath the water channels.

One version of the invention features a heat exchanger that has an elastic mat with an upper surface sized to substantially support a reclining dairy cow. The elastic mat incorporates at least one elastic channel and includes at least one inlet that connects to the mat (and has been adapted to connect to a water supply line) and at least one outlet that connects with the mat (and has been adapted to connect to a water drain line). The elastic channel(s) have been adapted to conduct water from the one inlet(s) to the outlet(s) beneath the surface over an area substantially greater than the contact area of a dairy cow to cool a dairy cow reclining on the elastic mat, and the elastic mat has been adapted to deform upon contact with the claws (a cow hoof is cloven into two parts called claws) of a rear hoof of a cow standing up from a lying position on the elastic mat to distribute forces over the entire hoof.

Thus at least one version of the invention features cushioning material placed beneath the channel(s) where the material will not interfere with heat transfer. The elastic channels transmit the weight of the cow to the cushioning lower layer. At least one other version of the invention features a heat exchanger that is cushioned to either prevent or mitigate hoof lameness, thereby reducing or eliminating the need for any bedding that may reduce heat-transfer efficiency.

The elastic mat may have an area of greater than 1 $m^2$.

Thus, at least one version of the invention features a cooling interface that can provide a sufficient amount of heat exchange over the entire contact area of a typical resting cow.

The portion of the elastic mat beneath the channels with respect to the surface may be thicker than a portion of the elastic mat above the channels with respect to the surface before deformation by a cow reclining on the elastic mat.

Thus at least one version of the invention features a mechanism for ensuring cushioning of sufficient thickness to mitigate hoof injury and deter modification of resting behavior without increasing the thermal resistance that exists between the water channels and the cow. With the channels positioned at the top of the mat, additional cushioning will not affect heat transfer.

The material of the elastic mat may separate channel(s) from the surface by providing an average thermal resistance of less than 0.04 K/W between the water in the channel and the surface over the contact area.

Thus at least one version of the invention minimizes the adverse effect that any cushioning material may have on heat transfer.

A sheet material of less than 4 mm in thickness may separate the channel(s) from the surface.

Thus at least one version of the invention features an upper material that is thin enough to alleviate any significant concern about the material's thermal resistivity yet thick enough to adequately resist damage, The elastic mat may have a continuous upper surface.

Thus at least one version of the invention features a heat exchanger system that is easy to clean and maintain.

To prevent the condensation that can form on the elastic surface under various microclimate conditions, a temperature control unit may be added.

With respect to the remainder of the elastic mat, the upper layer defining the surface may have reduced elasticity in some dimensions. In one version, the upper layer may provide an elastomer (incorporating fibers with lower elasticity than an elastomer of the upper layer).

Thus at least one version of the invention features a mat with force-spreading ability so that the cushioning effect of the mat will be adequate both when the cow's weight is spread over the entire surface and also during point loading under the cow's rear hooves when the cow attempts to rise.

The elastic mat may be comprised of a closed-cell, elastomeric foam, the inner portion featuring upwardly open troughs defining the channel(s) covered by a substantially continuous solid cell-free elastomeric sheet.

Thus at least one version of the invention provides a simple method for manufacturing the elastic channels that does not interfere with cushioning.

The mat may provide at least two zones, each with a different elasticity, one zone adapted to support the rear quarters of a cow reclining on the elastic mat and a second portion of the elastic mat lying outside of the first portion.

Thus at least one version of the invention features special properties at the rear of the mat to help reduce the risk of causing a modified resting behavior caused by rear-hoof lameness. A cow when rising will first gather its hind quarters and in doing so may place additional pressure on the outer surfaces of the claws of the rear hoof The mat may provide at least a first zone adapted to support rear quarters of a cow reclining on the elastic mat and a second zone, outside of the first, wherein the first includes a greater density of channels.

Thus, for more efficient operation, at least one version of the invention features a heat exchanger system that tailors heat-exchanging properties to suit different anatomical regions of the cow.

The heat exchanger may provide multiple elastic channels that conduct water through different yet parallel paths from at least one inlet to at least one outlet.

Thus at least one version of the invention reduces the pressure drop and the temperature increase that occur when water passes through the mat, and water supply lines of greater length and mats can be optimally linked in series and parallel.

The multiple elastic channels intersect each other at multiple locations to form a network.

Thus at least one version of the invention features a system for distributing water along multiple channels to produce a more evenly distributed cooling effect.

The periphery of the elastic mat may feature tabs adapted to receive fasteners that secure the mat to a concrete stall floor.

Thus at least one version of the invention enables it to be stabilized in a concrete cow stall.

A system of mats may be arranged either in series or in parallel where at least one outlet from a preceding mat connects with at least one inlet of a succeeding mat in the series so that water can flow from one mat to the next and thus pass through all the mats in the series.

Thus at least one version of the invention features a cost-effective water delivery system in which cooling water may be shared among mats.

The mats may be used by circulating water from the inlet to the outlet to provide for a heat transfer in excess of 500 W between a cow reclining on the elastic mat and the conducted water.

Thus at least one version of the invention features a heat exchanger system that may substantially eliminate the need for evaporative pads, water sprayers and fans and their associated environmental burden.

The elastic mat and an insulating layer may be placed on a concrete slab that is substantially free of sand or compost, and it may be exposed on its upper surface and in direct contact with a cow.

Thus at least one version of the invention eliminates the hygienic and disposal problems associated with loose bedding (and especially sand, which can interfere with or damage manure handling equipment).

These particular objects and advantages may apply to only those versions of the invention that fall within the claims and thus do not define the scope of the invention.

DETAILED DESCRIPTION OF THE PREFERRED EMBODIMENT

Figure 1:
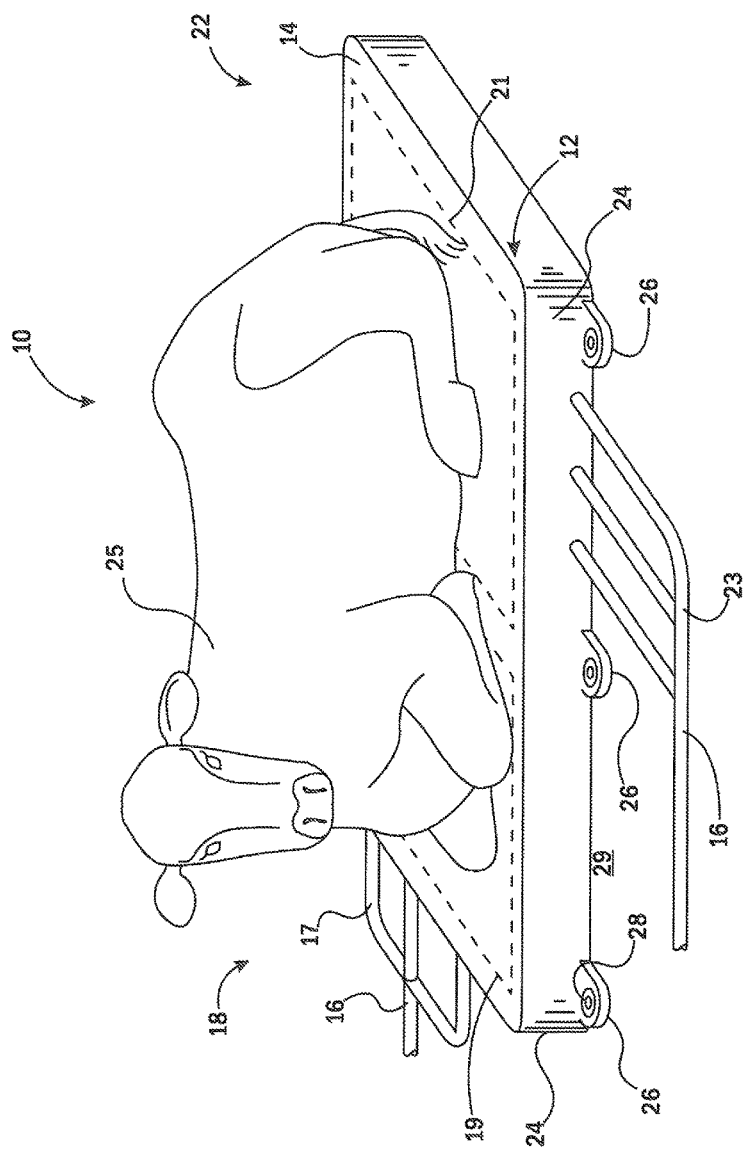
FIG. 1 is a perspective view of a mat constructed according to the specifications of the present invention and showing the connected input and output lines and anterior and posterior zones with respect to a cow's typical orientation.

Referring now to FIG. 1, a heat exchanger system 10 according to the present invention may provide for a generally planar rectangular elastic mat 12 having a substantially continuous upper surface 14, and in one example having an area of approximately 4 feet in width and 6 feet in length and a vertical thickness of 2 to 4 inches. In some embodiments, the mat 12 provides an area that can substantially fully support a reclining cow.

Water inlet lines 16 are attached to a superior end 18 of the mat 12 to introduce water into a superior region 19 of the mat 12, the superior region 19 intended to be positioned under the front quarters of a cow 25 lying on the mat 12. Corresponding water outlet lines 20 are attached to a left side of the inferior end 22 of the mat 12 near an inferior region 21, the latter intended to be positioned under the hindquarters of the cow 25. Each of the water inlet lines 16 and water outlet lines 20 connect, through a mat sidewall 24, with the interior of the mat as will be described.

Mounting tabs 26 may extend from lower edges of the sidewalls 24 of the mat 12 to receive mounting hardware 28 (a washer and headed fastener, for example) for attaching the mat 12 to a concrete slab 29 or the like. During use, the slab 29 and the mat 12 may be substantially free of other bedding materials including sand.

Figure 2:
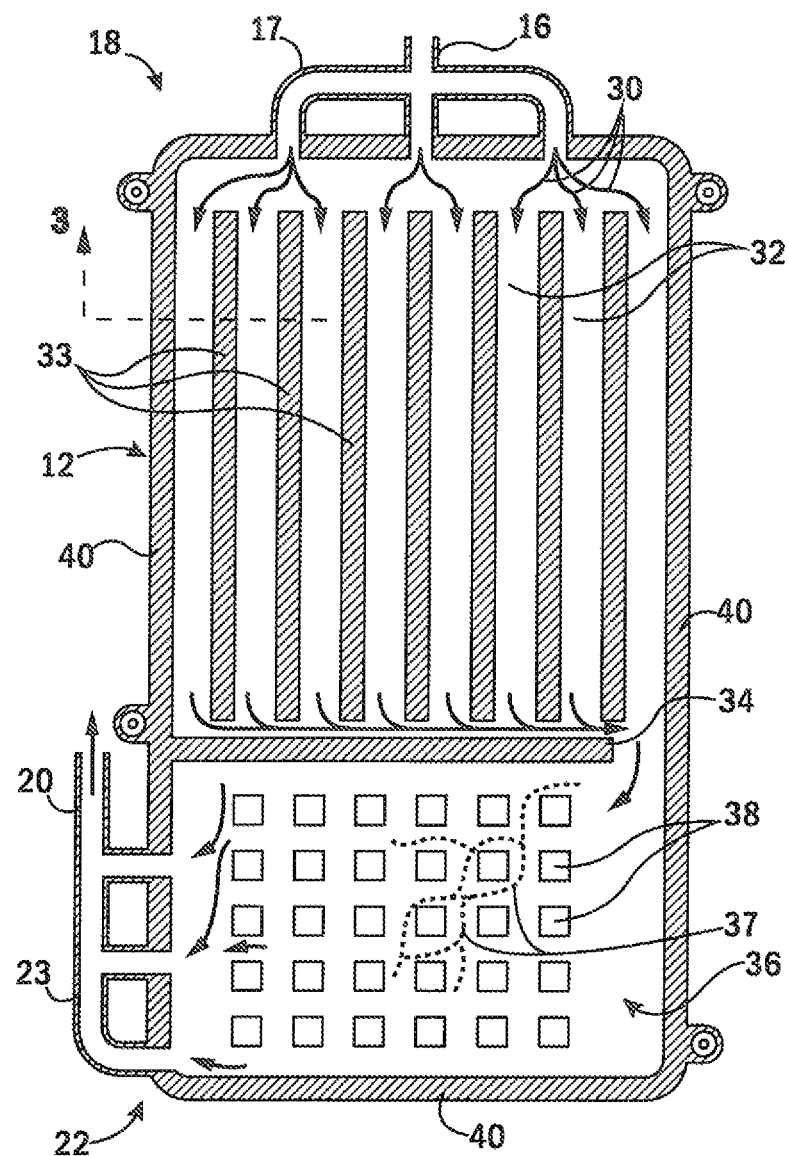
FIG. 2 is a top plan cross-section of the mat shown in FIG. 1 and depicts the different channel configurations for the anterior and posterior zones.

Referring now to FIG. 2, the water inlet lines 16 deliver water 30 into a set of channels 32 located inside the mat 12 and separated by divider walls 33. In the superior region 19, the channels 32 are generally parallel along an inferior-superior axis and extend from the superior end 18 for about two thirds the length of the mat 12. The water inlet lines 16 may be attached to a manifold 17 dividing the introduced water 30 outside of the mat 12 so that the water will enter various different channels 32 along the width of the superior end 18 to provide a substantially even water flow in an inferior-superior direction through the various channels 32.

At the end of the channels 32 within the mat 12, a diverter wall 34 may channel the water to a right side of the mat 12 and into a channel network 36 at the inferior region 21 occupying the final third of the mat 12. This channel network 36 provides a mesh of channels 37 separated by pillars 38 arranged in rows and columns aligned with the height and width of the mat 12 and thus providing a diffuse flow of the water from the right side of the inferior end 22 to the left side of the mat 12, where it is received by the outlet lines 20, and also through a manifold 23 that provides multiple outlets spaced along the left side of the inferior end 22 of the mat 12.

The channels 32 and 37 are otherwise fully surrounded by a skirt wall 40 that serves to retain water flow within the mat 12.

Figure 3:
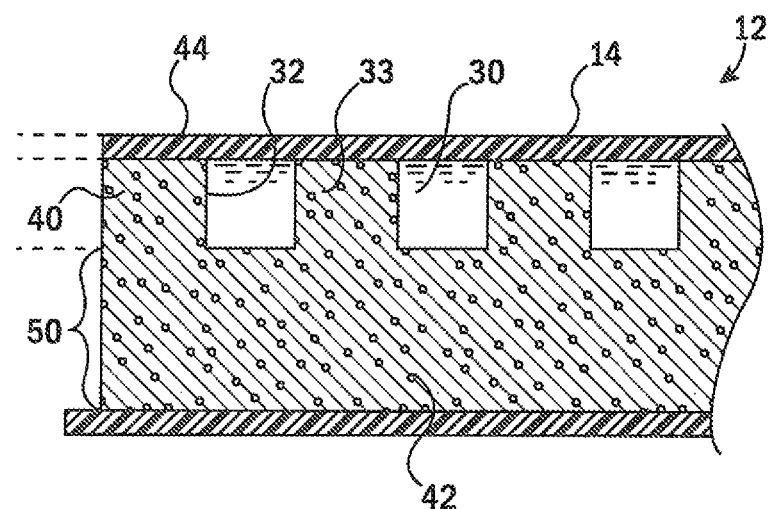
FIG. 3 is a fragmentary cross-section along line 3-3 of FIG. 2 and shows a closed-cell foam body with incised channels covered by a solid rubber sheet (in accordance with one embodiment of the invention)

Referring now to FIG. 3, each of the channels 32 and 37 (the latter not shown in FIG. 3) may be formed by grooves cut or molded in the upper surface of a closed-cell elastomeric foam material 42 with the walls 33 and pillars 38 (the latter not shown in FIG. 3) and the skirt wall 40 constructed of the elastomeric foam material 42 itself. Suitable elastomeric foam materials 42 include a closed-cell foam material available from Foxworthy Supply Inc. of Michigan USA under the trade name of Foamat™. The channels 32 and 37 may be approximately 1 inch deep, and the mat will typically have a thickness ranging from 1 inch to 3 inches in depth.

The upper surface of each groove forming channels 32 or 37 may be covered by a solid rubber-like sheet material 44 (as will be described further below) to seal water 30 within channels 32 or 37. In one embodiment the solid sheet material 44 will be approximately 2 mm thick and, preferably, will range from 1 mm to 4 mm in thickness to provide resistance against tearing while ensuring a relatively low thermal resistance. More generally, the material of the sheet 44 will be selected according to its elastic flexibility and its ability to comport with the desired cushioning of the mat 1.2 and its ability to provide an average resistance of less than 0.04 Kelvin per watt (and preferably less than 0.02 Kelvin per watt) between the water 30 in the channels 32 and 37 across the entire area in contact with the cow 25 (approximately one square meter on average). In this way, with respect to water typically chilled (approximately) to 15 degrees Celsius or 60 degrees Fahrenheit, a heat transfer in excess of 500 watts (and preferably in excess of 1000 watts) may be achieved between the cow 25 and the water 30. Suitable materials include a 2 mm rubberized to/woven back cover commercially available under the trade name of MC2 Cow Mat Trop Cover from North Brook Farms of Auburn, N.Y., USA. This material has a thermal conductivity of approximately 0.1 W/m-K.

In one embodiment, the channel density in the inferior region 21 (that is, the ratio of the upper surface area of channels 32 or 37 per area of the mat 12) is made greater than in the superior region 19 to provide increased heat transfer from the inferior anatomy of the cow 25 including the udder.

It will be understood from FIG. 3, that channels 32 and 37 are proximate to the upper surface of the mat 12, which will be in closest contact with the cow 25 and that the bulk of the cushioning provided by the mat 12 is displaced behind or below the channels 32 or 37 in a supporting region 50 at the bottom of the mat 12 being generally equal to or greater than the height of the channels. By providing channels 32 and 37, which are substantially elastic (because of the elasticity of the walls 33 and pillars 38), the cushioning of region 50 need not be interposed between the cow 25 and the water 30, such as would reduce heat flow, but can instead operate through channels 32 and 37.

Figure 4:
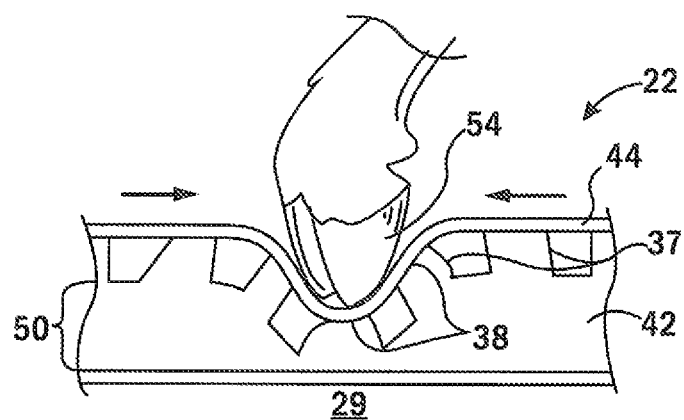
FIG. 4 is a diagrammatic cross-section similar to that shown in FIG. 3 and depicts the "tenting" support that is provided to the outer rear claw of the hoof whenever the cow rises.

Referring now to FIGS. 2 and 4, it should be noted that the cumulative cushioning effect provided by the foam material 42 in the supporting region 50 and the foam material forming the walls 33 and pillars 38 in the inferior region 21 will be softer than the cushioning provided by the same structures existing in the superior region 19, and also that this is a result of the reduced areal density of walls 33 in the superior region 19 compared to pillars 38 in the inferior region 21. "Softer" in this context means a lower effective spring constant, one that allows greater deformation in reaction to a given amount of force. This softer cushioning provides greater force to be spread to the claws of the cows hoof 54, which typically experience higher forces when the cow 25 stands up. By reducing the point-of-contact forces, the mat may reduce the risk of modified resting behavior and resulting lameness or exacerbation of lameness.

Figure 5:
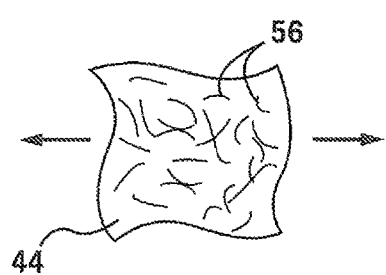
FIG. 5 is a top-plan fragmentary representation of the fibers dispersed throughout the top rubber sheet to reduce tensile stretching.

Referring also to FIG. 5, sheet material 44 may include woven or nonwoven fibers 56 that tend to reduce the elasticity of the sheet material 44 in directions parallel to its broad surface. As shown in FIG. 4, a result is that pressure exerted by the hoof 54 causes the sheet material 44 to envelope to some degree the claws of the hoof 54 and produce a tenting across multiple pillars 38 that tends to stiffen the cushioning with increased reflection, thus preventing a "bottoming out" of the hoof 54 against the slab 29.

Figure 6:
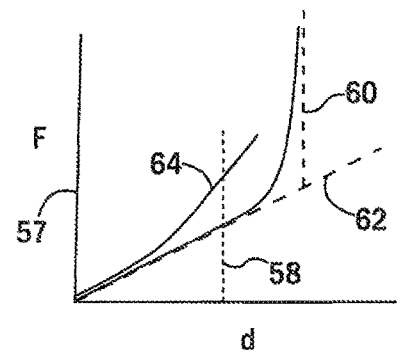
FIG. 6 is a simplified diagram of the force-versus-compression distance for the weight of a typical cow (without "bottoming out" against concrete slab)

Referring more generally now to FIG. 6, the elasticity of the combined cushioning of foam material 42 in region 50 of the mat 12 and of the walls 33 and pillars 38 is adjusted so that any given force 57 expected to be exerted by a full-grown cow 25 over the area of the hoof 54 will provide a compression 58 of the mat 12 that is less than a compression that would reach the force asymptote 60 near where the Hooke's relationship 62 of spring materials breaks down because of a full compression of the material. Generally, the tenting action will provide a somewhat stiffer response 64 than would be provided by only the spring alone for high deflections and a stiffness comparable to only the spring for lower deflections. In this respect, the mat 12 may be suitable for cushioning the broad area of the cow 25 as well as the points-of-contact of the hoof 54.

Figure 7:
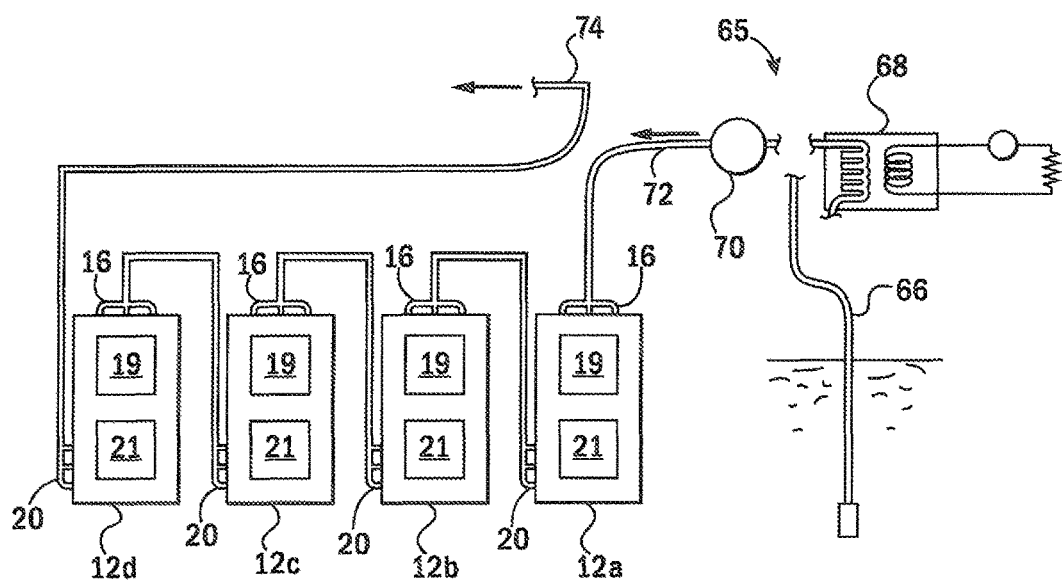
FIG. 7 is an exemplary block diagram showing multiple pads interconnected in series to a source of chilled water.

Referring now to FIG. 7, multiple mats 12a-12c may be connected to a single supply system 65 providing, for example, chilled water from a source (either an aquifer 66 or a conventional closed-cycle refrigeration system 68). Water chilled to a temperature ranging from 40 to 70 degrees Fahrenheit may be pumped (by pump 73) to be received at a first mat 12a through the inlet lines 16 of that mat 12a. Water passing out of mat 12a through the outlet lines 20 may then be fed to the inlet lines 16 of mat 12b. In a similar manner, water may pass from mat 12b to mat 12c and from there to mat 12d.

Water exiting through outlet lines 20 of mat 12d may pass back to a discharge line 74 and either back into the aquifer or into the heat exchanger of a closed-system refrigeration unit.

Certain terminology is used herein for purposes of reference only, and thus is not intended to be limiting. For example, terms such as "upper," "lower," "above" and "below" refer to directions in the drawing to which a reference is made. Terms such as "front," "back," "rear," "bottom" and "side" describe the orientations of portions of a component within a consistent but arbitrary frame of reference that is made clear by reference to the text and the associated drawings describing any component under discussion. Such terminology may include the words specifically mentioned above, derivatives thereof, and/or words of similar import. Similarly, the terms "first" and "second," and other such numerical terms referring to structures, do not imply a sequence or order unless clearly indicated by explicit statement or context.

When introducing elements or features of the present disclosure and the exemplary embodiments, the articles "a,"

"an," "the" and "said" are intended to mean that one or more of such elements or features exist. The terms "comprising," "including" and "having" are intended to be inclusive and mean that there may be additional elements or features other than those specifically noted. It is also to be understood that the methodical steps, processes, and operations described herein are not to be construed as necessarily requiring their performance in the particular order either discussed or illustrated, unless an order of performance is specifically identified. It is also to be understood that additional or alternative steps may be employed.

It is specifically intended that the present invention will not be limited to the embodiments and illustrations contained herein and that the claims herein should be understood to include modified forms of the invention's various embodiments including portions of the embodiments and combinations of elements of different embodiments as would come within the scope of the following claims. All of the publications described herein, including patents and non-patent publications are hereby incorporated herein by reference in their entireties.

We make the following claims:

1. A heat exchanger for livestock comprising:
   an elastic mat having an upper surface sized to substantially support a dairy cow reclining on the elastic mat, and in contact with the elastic mat over a contact area, with the elastic mat incorporating beneath the upper surface at least one elastic channel;
   at least one inlet connecting with the at least one elastic channel and adapted to connect to a water supply line;
   at least one outlet connecting with the at least one elastic channel and adapted so that it can be connected to a water drain line;
   wherein the at least one elastic channel is adapted to conduct water beneath the upper surface over an area substantially greater than the contact area to cool a dairy cow reclining on the elastic mat;
   wherein the elastic mat comprises a closed-cell, elastomeric foam inner portion having upwardly open troughs defining the at least one elastic channel and the open troughs are directly contacted by a continuous, solid, cell-free elastomeric sheet defining the upper surface;
   wherein a portion of the elastic mat beneath the at least one elastic channel is adapted to deform upon contact with the claws of a rear hoof of a cow standing up from a lying position on the elastic mat in order to distribute forces over the entire hoof;
   wherein a portion of the elastic mat beneath the at least one channel with respect to the upper surface is thicker than a portion of the elastic mat above the channels with respect to the upper surface before deformation by a cow on the elastic mat; and
   wherein the elastomeric sheet includes a layer reducing the elasticity of the sheet in a direction parallel to its broad surface.

2. The heat exchanger of claim 1 wherein the elastic mat has an area of greater than 1 m².

3. The heat exchanger of claim 1 wherein the elastomeric sheet has an average resistance of less than 0.04 K/W.

4. The heat exchanger of claim 1 wherein the elastomeric sheet has a thickness of less than 4 mm.

5. The heat exchanger of claim 1 wherein the elastic mat has a continuous upper surface.

6. The heat exchanger of claim 1 wherein the elastomeric sheet is formed from a material having a first elasticity and incorporates the layer which has a second elasticity, wherein the second elasticity lower than the first elasticity.

7. The heat exchanger of claim 1 wherein the mat provides at least two zones of different elasticity: a first zone of the elastic mat adapted to support the hind quarters of a cow reclining on the elastic mat and a second zone of the elastic mat lying outside the first zone.

8. The heat exchanger of claim 1 providing at least a first zone adapted to support the hind quarters of a cow reclining on the elastic mat and a second zone lying outside of the first zone and wherein the first zone includes a greater density of channels.

9. The heat exchanger of claim 1 providing multiple elastic channels for a parallel conduction of water from at least one inlet to at least one outlet through different paths.

10. The heat exchanger of claim 9 wherein the multiple elastic channels intersect each other at multiple locations to form a network.

11. The heat exchanger of claim 1 further including tabs at a periphery of the elastic mat, the tabs adapted to receive fasteners bolding the mat to a concrete stall floor.

12. A livestock cooling system comprising elastic mats arranged in series and each having:
    an upper surface sized to substantially support a dairy cow reclining on the elastic mat and in contact with the elastic mat over a contact area, the elastic mat incorporating beneath the upper surface at least on elastic channel;
    at least one inlet communicating with the elastic mat and adapted to connect to a water supply line;
    at least one outlet communicating with the elastic mat and adapted to be connected to a water drain line
    wherein at least one elastic channel is adapted to conduct water from at least one inlet to at least one outlet beneath the surface over an area substantially greater than the contact area in order to cool a dairy cow reclining on the elastic mat and wherein a portion of the elastic mat beneath at least one channel is adapted to deform upon contact with an outer claw of a rear hoof of a cow standing up from a lying position on the elastic mat in order to distribute forces over the outer claw;
    wherein at least on outlet from a preceding mat communicates with at least one inlet from a succeeding mat in the series so that water flows in series through multiple mats
    wherein the elastic mat comprises a closed-cell, elastomeric foam inner portion having upwardly open troughs defining the at least one elastic channel and the open troughs are directly contacted by a continuous, solid, cell-free, elastomeric sheet defining the upper surface;
    wherein a portion of the elastic mat beneath the at least one channel with respect to the upper surface is thicker than a portion of the elastic mat above the channels with respect to the upper surface before deformation by a cow reclining down on the elastic mat; and
    wherein the elastomeric sheet includes a layer reducing the elasticity of the sheet in a direction parallel to its broad surface.

13. A method of providing cooling to dairy cows comprising:
    (a) providing an elastic mat having;
        (i) an upper surface sized to substantially support a dairy cow reclining on the elastic mat and in contact with the elastic mat over a contact area, the elastic mat incorporating beneath the surface at least one elastic channel;

(ii) at least one inlet communicating with the elastic mat and adapted to connect to a water supply line;
(iii) at least one outlet communicating with the mat and adapted to be connected to a water drain line
wherein the at least one elastic channel is adapted to conduct refrigerant from the at least one inlet to the at least one outlet beneath the surface over an area substantially greater than the contact area required to cool a dairy cow reclining on the elastic mat and wherein a portion of the elastic mat beneath the at least one channel is adapted to deform upon contact with the claws of a rear hoof of a cow standing up from a reclining position on the elastic mat in order to distribute forces over the entire hoof;
(iv) wherein a portion of the elastic mat beneath the at least one elastic channel is adapted to deform upon contact with the claws of a rear hoof of a cow standing up from a lying position on the elastic mat in order to distribute forces over the entire hoof;
(v) wherein a portion of the elastic mat beneath the at least one channel with respect to the upper surface is thicker than a portion of the elastic mat above the channels with respect to the upper surface before deformation by a cow on the elastic mat; and
(vi) wherein the elastomeric sheet includes a layer reducing the elasticity of the sheet in a direction parallel to its broad surface;
(b) circulating refrigerant from the inlet to the outlet to provide for a heat transfer in excess of 500 W between a cow reclining on the elastic mat and the conducted water.

14. The method of claim 13 in which the elastic mat is placed on a concrete slab that is substantially free of sand and is exposed to direct contact with the cow.

15. The heat exchanger of claim 1, wherein the layer is formed of fibers.

* * * * *